United States Patent
Yang et al.

(10) Patent No.: US 9,133,283 B2
(45) Date of Patent: Sep. 15, 2015

(54) DUAL CURE COMPOSITIONS, METHODS OF CURING THEREOF AND ARTICLES THEREFROM

(75) Inventors: Patrick Wenliang Yang, Ballston Lake, NY (US); Wendy Wen-Ling Lin, Niskayuna, NY (US); Paul Takao Furuta, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 80 days.

(21) Appl. No.: 13/533,685

(22) Filed: Jun. 26, 2012

(65) Prior Publication Data

US 2012/0322909 A1 Dec. 20, 2012

Related U.S. Application Data

(62) Division of application No. 11/235,624, filed on Sep. 20, 2005, now abandoned.

(51) Int. Cl.

| | | |
|---|---|---|
| *C08F 2/48* | (2006.01) | |
| *C08J 3/28* | (2006.01) | |
| *C08J 7/12* | (2006.01) | |
| *B32B 5/18* | (2006.01) | |
| *B32B 5/26* | (2006.01) | |
| *B32B 5/28* | (2006.01) | |
| *B32B 9/00* | (2006.01) | |
| *B32B 17/04* | (2006.01) | |
| *B32B 27/04* | (2006.01) | |
| *B32B 27/12* | (2006.01) | |
| *B32B 27/30* | (2006.01) | |
| *C08K 3/36* | (2006.01) | |
| *C08K 7/14* | (2006.01) | |
| *C09D 4/00* | (2006.01) | |
| *C08J 5/24* | (2006.01) | |

(52) U.S. Cl.
CPC ... *C08F 2/48* (2013.01); *B32B 5/18* (2013.01); *B32B 5/26* (2013.01); *B32B 5/28* (2013.01); *B32B 9/00* (2013.01); *B32B 17/04* (2013.01); *B32B 27/04* (2013.01); *B32B 27/12* (2013.01); *B32B 27/30* (2013.01); *C08J 5/24* (2013.01); *C08K 3/36* (2013.01); *C08K 7/14* (2013.01); *C09D 4/00* (2013.01); *C08J 2363/00* (2013.01)

(58) Field of Classification Search
CPC .................. C08F 2/46; C08J 5/24; C08J 7/02; C08J 7/08; C08J 7/06; C08J 7/12; C08J 7/16; C08J 7/18; C08J 2363/00; B32B 27/30; B32B 27/38; B32B 9/00; C09D 4/00; C09D 4/06

See application file for complete search history.

(56) References Cited

U.S. PATENT DOCUMENTS

| | | |
|---|---|---|
| 3,331,761 A | 7/1967 | Mao |
| 3,450,616 A | 6/1969 | Eldred |
| 3,574,040 A | 4/1971 | Chitwood |
| 3,619,392 A | 11/1971 | Metzner et al. |
| 4,116,788 A | 9/1978 | Schmitt et al. |
| 4,132,755 A | 1/1979 | Johnson |
| 4,230,766 A | 10/1980 | Gaussens |
| 4,265,723 A | 5/1981 | Hesse |
| 4,605,465 A | 8/1986 | Morgan |
| 4,882,201 A | 11/1989 | Crivello et al. |
| 4,920,164 A | 4/1990 | Sasaki et al. |
| 4,942,013 A | 7/1990 | Palmer et al. |
| 5,015,675 A | 5/1991 | Walles et al. |
| 5,206,077 A | 4/1993 | Cowley et al. |
| 5,288,767 A | 2/1994 | Cramer |
| 5,290,883 A | 3/1994 | Hosokawa et al. |
| 5,380,775 A | 1/1995 | Cowley |
| 5,407,972 A | 4/1995 | Smith et al. |
| 5,500,164 A | 3/1996 | Livesay et al. |
| 5,554,666 A | 9/1996 | Livesay |
| 5,554,667 A | 9/1996 | Smith et al. |
| 5,660,527 A | 8/1997 | Deering |
| 5,747,553 A | 5/1998 | Guzauskas |
| 5,843,354 A | 12/1998 | Evans |
| 5,854,298 A | 12/1998 | McNay |
| 6,171,700 B1 | 1/2001 | Sugita |
| 6,207,726 B1 | 3/2001 | Ohtani |
| 6,316,089 B1 | 11/2001 | Ohtani |
| 6,333,064 B1 | 12/2001 | Gan |
| 6,345,984 B2 | 2/2002 | Karmaker |
| 6,454,536 B1 | 9/2002 | Evans |

(Continued)

FOREIGN PATENT DOCUMENTS

| | | |
|---|---|---|
| EP | 0008127 | 4/1982 |
| EP | 0249201 | 6/1987 |

(Continued)

OTHER PUBLICATIONS

Goodman, Daniel L. et al.,"Curing and Bonding of Composites using Electron Beam Processing", Preprint of Chapter 11 in the Handbook of Polymer Blends& Composites, A.Kulshreshtha and C. Vasile, eds.,Rapra Technology Ltd, publisher, Shropshire, UK (42 pages).

(Continued)

*Primary Examiner* — Sanza McClendon
(74) *Attorney, Agent, or Firm* — Ann M. Agosti

(57) ABSTRACT

The invention relates to a wind power plant comprising a vertically disposed shaft (2), a rotor with a number of straight or slightly curved blades (3, 4) which are parallel to the shaft (2); said rotor rotates round the shaft (2) whereby at least, one rotor blade (3, 4) which is disposed on the side facing the shaft (2) has a strip (5), which, in turn, is parallel to the shaft and projects from the surface of the rotor-blade (3, 4).

23 Claims, 3 Drawing Sheets

(56) References Cited

U.S. PATENT DOCUMENTS

| | | |
|---|---|---|
| 6,518,362 B1 | 2/2003 | Clough et al. |
| 6,602,958 B2 | 8/2003 | Briggs et al. |
| 6,632,892 B2 | 10/2003 | Rubinsztajn et al. |
| 6,646,022 B2 | 11/2003 | Okazaki |
| 6,713,144 B2 | 3/2004 | Bundo |
| 6,773,855 B1 | 8/2004 | Iijima et al. |
| 6,800,373 B2 | 10/2004 | Gorczyca |
| 6,835,759 B2 | 12/2004 | Bradford |
| 6,852,771 B2 | 2/2005 | Balch |
| 6,884,841 B2 | 4/2005 | Nava |
| 7,144,544 B2 | 12/2006 | Bulluck |
| 7,151,123 B2 | 12/2006 | Ramsey |
| 7,294,657 B2 | 11/2007 | Olson |
| 7,329,713 B2 | 2/2008 | Schorr |
| 7,390,559 B2 | 6/2008 | Mayo |
| 7,927,077 B2 | 4/2011 | Olson |
| 7,981,944 B2 | 7/2011 | Weber et al. |
| 8,048,981 B2 | 11/2011 | Furuta |
| 2003/0078316 A1 | 4/2003 | Bradford |
| 2004/0115363 A1 | 6/2004 | Desai et al. |
| 2004/0147120 A1 | 7/2004 | Rogalli et al. |
| 2004/0157003 A1 | 8/2004 | Baumgart et al. |
| 2004/0166241 A1 | 8/2004 | Gallo et al. |
| 2004/0170119 A1 | 9/2004 | Watanabe |
| 2004/0170850 A1 | 9/2004 | Nava |
| 2004/0214912 A1 | 10/2004 | Rink et al. |
| 2004/0235997 A1 | 11/2004 | Meisenburg et al. |
| 2005/0025903 A1 | 2/2005 | Fink |
| 2005/0026069 A1 | 2/2005 | Yeh |
| 2005/0027074 A1 | 2/2005 | Lewin et al. |
| 2005/0043430 A1 | 2/2005 | Weber et al. |
| 2005/0090620 A1 | 4/2005 | Grace et al. |
| 2005/0123768 A1 | 6/2005 | Fischer et al. |
| 2007/0021553 A1 | 1/2007 | Lichte |
| 2007/0066698 A1 | 3/2007 | Yang |
| 2007/0087123 A1 | 4/2007 | Weber et al. |
| 2009/0229747 A1 | 9/2009 | Olson |
| 2010/0272574 A1 | 10/2010 | Lin |

FOREIGN PATENT DOCUMENTS

| | | |
|---|---|---|
| EP | 0276501 | 4/1994 |
| EP | 1645607 A1 | 4/2006 |
| WO | WO 94/22968 | 10/1994 |
| WO | WO 97/12945 | 4/1997 |
| WO | 02098657 A2 | 12/2002 |
| WO | 03078477 A1 | 9/2003 |
| WO | WO 03/072628 | 9/2003 |
| WO | WO 2004035651 A1 | 4/2004 |
| WO | WO 2004092787 A1 | 10/2004 |

OTHER PUBLICATIONS

Koleske, Joseph V., "Dual-Cure Mechanisms", Ch. 9 in Radiation Curing of Coatings, ASTM International (ASTM stock #: MNL45); pp. 155-164, (Apr. 2002).

DUAL CURE COMPOSITIONS, METHODS OF CURING THEREOF AND ARTICLES THEREFROM

This application is a divisional application of pending U.S. patent application Ser. No. 11/235,624 filed Sep. 20, 2005, priority to which is claimed.

BACKGROUND

The invention relates generally to dual cure compositions, methods of curing, and resulting articles.

Formation of thick sections by curing of thermoset resins (sometimes referred to hereinafter as curable monomers) has been generally problematic. Most traditional thermally cured reactive formulations have short work-life and long cure time. On the other hand, photocured formulations have long work-life and are capable of rapid cure, but curing is limited by the penetration depth of UV light, especially in materials with high levels of fillers which absorb or block UV light, such as in thick section composites, composite sandwich structures, and carbon fiber composites, thus resulting in uncured or incompletely cured portions. Curing thick carbon fiber composites has been demonstrated with e-beam technology. However, e-beam uses a high energy source which requires high cost capital investment.

The problems described have been addressed by the use of compositions comprising monomers that are cured by one or more energy sources. The cured compositions are typically derived from monomers having ethylenic units, isocyanate units, ester units, or the like, or combinations thereof. Curing of some of the compositions results in evolution of gases, which may become entrapped in the composition thus compromising some of the properties of the product. Also, the curing methods result in inefficient energy usage. Alternatively, thick sections have been formed by joining multiple precured panels or plies. But this results in bond lines. Thus, there is a need in the art to develop novel curable compositions and more efficient and cost-effective methods to fabricate thick sections, structures and articles.

BRIEF DESCRIPTION

In one embodiment, the invention provides a cured dual cure composition comprising at least one UV opaque filler; at least one curable monomer comprising at least one of an ethylenic unit or cyclic ether unit or mixture thereof; at least one photoinitiator; and at least one thermal initiator.

In another embodiment, the invention provides a method of curing a dual cure composition comprising the steps of: (i) providing a dual cure composition comprising at least one filler, at least one curable monomer comprising at least one of an ethylenic unit or cyclic ether unit or mixture thereof; at least one photoinitiator; and at least one thermal initiator; (ii) exposing the composition to radiation of a wavelength made available from a radiation source to at least partially photocure the composition and to provide an exotherm sufficient to complete the curing of the composition by thermal curing; and (iii) then turning off the radiation source before complete curing is achieved.

In yet another embodiment, the invention provides a method of making a cured dual cure composition comprising the steps of (i) providing a dual cure composition comprising at least one filler comprising glass fibers, fumed silica, or combinations thereof; at least one curable monomer comprising at least one of an ethylenic unit or cyclic ether unit or mixture thereof; at least one photoinitiator, and at least one thermal initiator; and (ii) exposing the dual cure composition to radiation of a wavelength made available from a radiation source to at least partially photocure the composition, and to provide an exotherm sufficient to initiate thermal curing to form a cured composition; wherein the cured composition is at least 6 millimeters thick.

In still another embodiment, the invention provides a method of making a cured dual cure composition comprising (i) providing a dual cure composition comprising at least one UV opaque filler comprising carbon fibers, carbon black, carbon nanotubes, silicon carbide, boron nitride, titanium dioxide, zirconium oxide, chalk, calcium sulfate, barium sulfate, calcium carbonate, silicates, talc, mica, kaolin, silica, aluminum hydroxide, magnesium hydroxide, polymer powder, polymer fiber, or combinations thereof; at least one curable monomer comprising at least one of an ethylenic unit or cyclic ether unit or mixture thereof; at least one photoinitiator; and at least one thermal initiator; and (ii) exposing the dual cure composition to radiation of a wavelength made available from a radiation source to at least partially photocure the composition, and to provide an exotherm sufficient to initiate thermal curing to form a cured composition; wherein the cured composition is at least 0.1 millimeter thick.

In a further embodiment, the invention provides a method of curing a dual cure sandwich structure comprising the steps of (i) providing a dual cure composition comprising at least one reinforcing filler core comprising foam, slitted foam, wood, honeycomb, or combinations thereof; at least one curable monomer comprising at least one of an ethylenic unit or cyclic ether unit or mixture thereof; at least one photoinitiator; and at least one thermal initiator; and (ii) exposing the dual cure composition to radiation of a wavelength made available from a radiation source to at least partially photocure the composition, and to provide an exotherm sufficient to initiate thermal curing to form a cured composition. Other embodiments of the invention comprise articles made by the methods described.

BRIEF DESCRIPTION OF THE DRAWINGS

These and other features, aspects, and advantages of the present invention will become better understood when the following detailed description is read with reference to the accompanying drawings.

DETAILED DESCRIPTION

Figure 1:
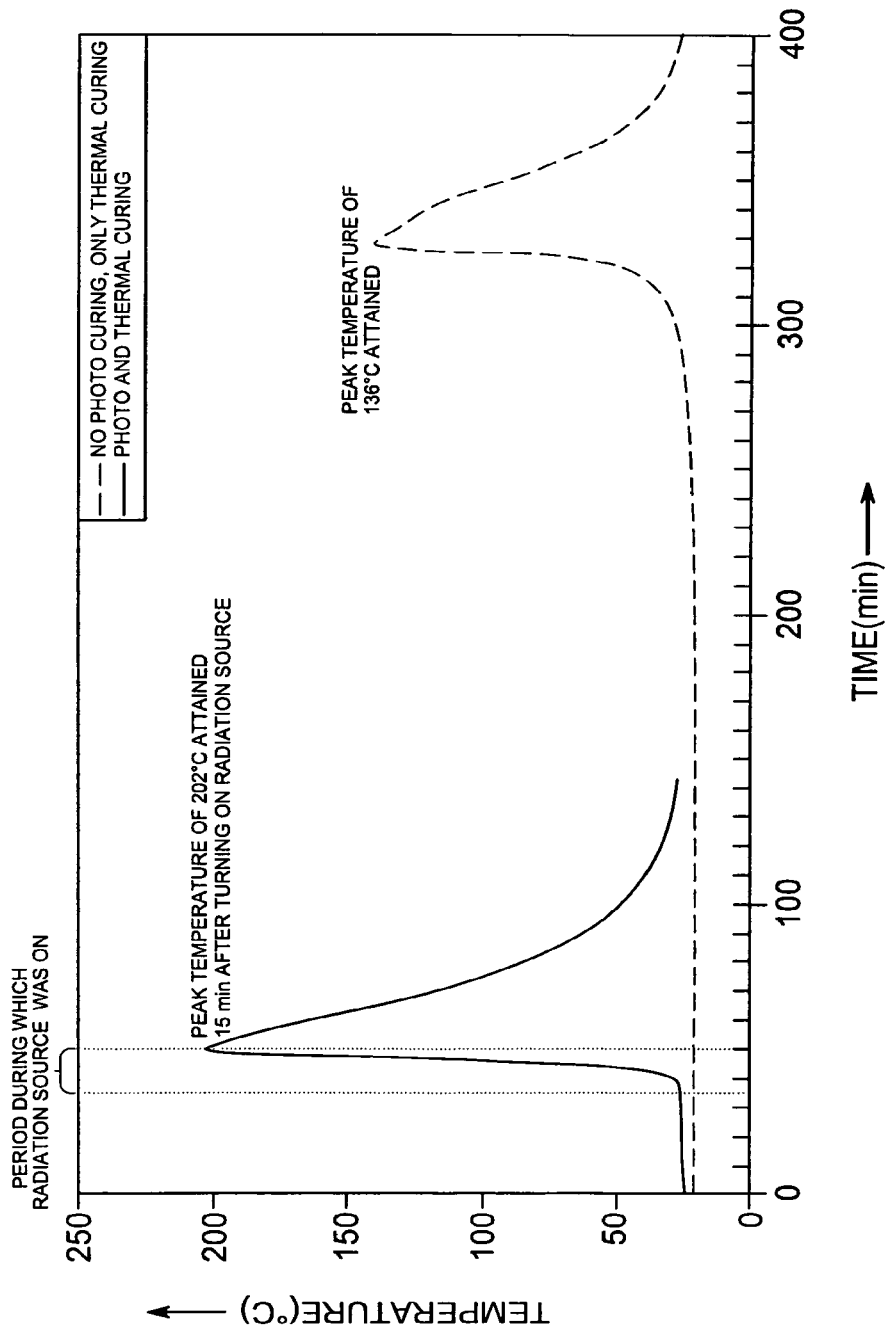
FIG. 1 shows the temperature profile at the center of two formulations in an embodiment of the invention as determined by an embedded thermocouple. The solid line shows the temperature profile of the formulation obtained by exposing the composition to radiation of a wavelength made available from a radiation source to at least partially photocure the composition and to provide an exotherm sufficient to complete the curing of the composition by thermal curing. The dashed line shows the temperature profile of the formulation that was not exposed to a radiation source.

Disclosed herein are compositions that may be cured by a combination of photocuring and thermal curing methods. The compositions comprise at least one filler, at least one curable monomer comprising at least one of an ethylenic unit or cyclic ether unit or mixture thereof, at least one photoinitiator, and at least one thermal initiator. As used herein, ethylenic unit refers to a compound comprising a carbon atom linked to another carbon atom through a double bond, and cyclic ether refers to a compound comprising an oxygen atom linked to carbon atoms and comprising a ring structure. In the specification and the claims which follow, singular forms "a", "an" and "the" include plural referents unless the context clearly dictates otherwise.

Fillers which may be present in compositions of the invention comprise organic or inorganic fillers, reinforcing fillers, extending fillers, nanoparticles, or the like, or mixtures thereof. In particular embodiments the filler generally comprises a reinforcing filler, such as, but not limited to, a fiber having high strength. The strength of the fibers may be further increased by using techniques known in the art, such as, but not limited to, forming a plurality of layers or plies, by orientation of the fibers in a direction, and like methods. The fibers may be made available in any conventional form such as, braided, unidirectional, woven fabric, knitted fabric, swirl fabric, felt mat, wound, and the like. Exemplary fibers that may be advantageously used in the invention comprise carbon fibers (e.g. TORAYCA® T800, TORAYCA® T700, and TORAYCA® T600 from Toray Industries, Inc.; MAGNAMITE® IM7 and MAGNAMITE® AS4 from Hexcel Corporation; and BESFIGHT® STS and BESFIGHT® HTS from Toho Tenax, Inc.), glass fibers (e.g. quartz, E-glass, S-2 glass, R-glass from suppliers such as PPG, AGY, St. Gobain, Owens-Corning, or Johns Manville), polyester fibers, polyamide fibers (such as NYLON™ polyamide available from E.I. DuPont, Wilmington, Del., USA), aromatic polyamide fibers (such as KEVLAR™ aromatic polyamide available from E.I. DuPont, Wilmington, Del., USA; or P84™ aromatic polyamide available from Lenzing Aktiengesellschaft, Austria), polyimide fibers (such as KAPTON™ polyimide available from E.I. DuPont, Wilmington, Del., USA), extended chain polyethylene (such as SPECTRA™ polyethylene from Honeywell International Inc., Morristown, N.J., USA; or DYNEEMA™ polyethylene from Toyobo Co., Ltd., or DSM, boron fibers, and the like. The fillers may be UV transparent fillers such as, but not limited to, glass, silica, fumed silica, alumina, zirconium oxide, nanoparticles, and the like. Alternately, the fillers may be UV opaque fillers such as, but not limited to, carbon fibers, carbon black, silicon carbide, boron nitride, zirconium oxide, titanium dioxide, chalk, calcium sulfate, barium sulfate, calcium carbonate, silicates such as talc, mica or kaolin, silicas, aluminum hydroxide, magnesium hydroxide, or organic fillers such as polymer powders, polymer fibers, or the like. In the present context UV opaque means that the material either blocks UV radiation, or absorbs UV radiation, or both. Those skilled in the art will recognize that, depending upon such factors as physical form or method of synthesis, certain fillers may be either UV opaque or UV transparent. Mixtures of more than one filler are also within the scope of the invention.

The filler is typically present in the composition in a range of from about 1% to about 90%, and more typically in a range of from about 10% to about 80% by weight, based on the total weight of the composition. More preferably, the filler is present in a range of from about 30% to about 75% by weight, based on the total weight of the composition.

The composition comprises at least one curable monomer. In some embodiments, the compositions typically comprise monomers having at least one ethylenic unit, cyclic ether unit, or epoxide unit, oxetane unit, or the like, or combinations thereof. In other embodiments, the compositions typically comprise monomers having at least one isocyanate unit, ester unit, or the like, or combinations thereof. Suitable curable monomers comprise unsaturated polyester such as POLYLITE® polyester resin available from Reichhold, SYNOLITE® polyester resin available from DSM, AROPOL™ polyester resin available from Ashland; vinyl esters such as DION®, NORPOL®, and HYDREX® resins available from Reichhold, DERAKANE®, DERAKANE MOMENTUM® and HETRON® resins available from Ashland, ATLAC E-NOVA® resin available from DSM; acrylates, diacrylates, dimethacrylates, multi-functional acrylates and multi-functional methacrylates such as polyester acrylates, epoxy acrylates and urethane acrylates, and the like, available from such companies as Cytec Surface Specialties, Sartomer, Rahn, and BASF. The curable monomer is typically present in a range of from about 90% by weight to about 10% by weight, based on the total weight of the composition, and more preferably, in a range of from about 80% by weight to about 20% weight, based on the total weight of the composition.

Suitable resins comprising at least one cyclic ether unit comprise aliphatic epoxy resins, cycloaliphatic epoxy resins such as ERL-4221, CYRACURE™ UVR-6110, CYRACURE™ UVR-6107, and CYRACURE™ UVR-6105 from Dow Chemical Company and UVACURE® 1500 from Cytec Surface Specialties; bisphenol-A epoxy resins, bisphenol-F epoxy resins, phenol novolac epoxy resins, cresol-novolac epoxy resins, biphenyl epoxy resins, multi-functional epoxy resins (i.e. epoxy resins comprising two or more epoxy groups), naphthalene epoxy resins (e.g., EPICLON® EXA-4700 from Dainippon Ink and Chemicals), divinylbenzene dioxide, 2-glycidylphenylglycidyl ether, dicyclopentadiene-type epoxy resins (e.g., EPICLON® HP-7200 from Dainippon Ink and Chemicals), multi-aromatic resin type epoxy resins, or the like, or combinations thereof. All of these classes of epoxy resins are known in the art and are widely available and preparable by known methods. Other illustrative examples of particular suitable epoxy resins and curing processes are described, for example, in U.S. Pat. Nos. 4,882,201, 4,920,164, 5,015,675, 5,290,883, 6,333,064, 6,518,362, 6,632,892, 6,800,373; U.S. Patent Application Publication No. 2004/0166241, and WO 03/072628 A1. Multi-functional oxetane resins are also within the scope of the invention.

In some embodiments photoinitiators used in the invention generate free radicals when exposed to radiation of wavelength at which the photoinitiators are active. In other embodiments suitable photoinitiators generate acid (photoacid generators, or PAGs) when exposed to radiation of wavelength at which the photoinitiators are active. Different types of photoinitiators can be used alone or as mixtures. In a particular embodiment a photoacid generator can be used together with a radical photoinitiator to initiate the curing of cationic curable monomers Suitable photoinitiators include, but are not limited to, organic peroxides, azo compounds, quinones, benzophenones, nitroso compounds, acryl halides, hydrazones, mercapto compounds, pyrylium compounds, triacrylimidazoles, bisimidazoles, chloroalkyltriazines, benzoin ethers, benzil ketals, thioxanthones, acetophenones, acylphosphine oxides, derivatives of the aforementioned compounds, and mixtures thereof. Exemplary photoinitiators comprise: benzil ketals such as 2,2-dimethoxy-2-phenyl acetophenone (available from Ciba Specialty Chemicals under the trademark IRGACURE® 651); acetophenone derivatives such as 2,2-diethoxyacetophenone ("DEAP", available from First Chemical Corporation); 2-hydroxy-2-methyl-1-phenyl-propan-1-one ("HMPP", available from Ciba Specialty Chemicals under the trademark DAROCUR®

1173); 2-benzyl-2-N,N-dimethylamino-1-(4-morpholinophenyl)-1-butanone (available from Ciba Specialty. Chemicals under the trademark IRGACURE® 369); 2-methyl-1-(4-(methylthio)phenyl)-2-morpholinopropan-1-one (available from Ciba Specialty Chemicals under the trademark IRGACURE® 907); or acylphosphine oxides such as 2,4,6-trimethylbenzoyl diphenylphosphine oxide ("TPO"), bis(2,6-dimethoxybenzoyl)-2,4,4-trimethylpentylphosphine oxide ("DMBAPO"), or bis(2,4,6-trimethylbenzoyl)-phenylphosphine oxide ("BTBPPO"). BTBPPO is available from Ciba Specialty Chemicals under the trademark IRGACURE® 819; DMBAPO is available from Ciba Specialty Chemicals in the form of blends with other ketones including: 25/75 wt % blend with HMPP as IRGACURE® 1700, and 1-hydroxy-cyclohexyl-phenyl-ketone, (or HCPK) as IRGACURE® 1850 or 1800 depending on proportions. TPO is also available from Ciba Specialty Chemicals in 50/50 wt % blends with HMPP (as IRGACURE® 4265). In a preferred embodiment, photoinitiators used are acylphosphine oxide type, most preferably IRGACURE® 819 available from Ciba Specialty Chemicals. Photoinitiators which generate acid when exposed to radiation of wavelength at which the photoinitiators are active include, but are not limited to, onium salts, aryl sulfonium and aryl iodonium salts of weakly basic anions, such as hexafluorophosphate or hexafluoroantimonate. Some particular examples comprise (4-(octyloxy)phenyl)phenyliodonium hexafluoroantimonate (OPPI) available from Hampford Research, triarylsulfonium hexafluorophosphate; [4-[(2-hydroxytetradecyl)oxy]phenyl] phenyliodonium hexafluoroantimonate available from Aldrich; UVACURE® 1600 from Cytec Surface Specialties, IRGACURE® 250 from Ciba Specialty Chemicals, IGM-C445 from IGM Resins, Inc., Bartlett, Ill.; CYRACURETh UVI6992 and CYRACURE™ UVI6976 from Dow Chemicals; ESACURE® 1064 and ESACURE® 1187 from Lamberti; R-gen 1130, R-gen BF1172, CHIVACURE® 1176 and CHIVACURE® 1190 from Chitec, and ferrocenium salts such as IRGACURE® 261 from Ciba Specialty Chemicals.

Suitable amounts of photoinitiator are in a range of from about 0.01% to about 20%, preferably in a range of from about 0.1% to about 10%, and most preferably in a range of from about 0.5% to about 5% by weight, based on the weight of the curable monomer.

The use of a photosensitizer to tune the activation wavelength of the photoinitiator is also within the scope of the invention. Typical photosensitizers include, but are not limited to, benzoin, benzoin methyl ether, benzoin ethyl ether, benzoin isopropyl ether, benzil(dibenzoyl), diphenyl disulfide, tetramethyl thiuram monosulfide, diacetyl, azobisisobutyronitrile, 2-methyl-anthraquinone, 2-ethyl-anthraquinone, 2-tert-butylanthraquinone, thioxanthone derivatives such as isopropyl-thioxanthone available from First Chemical Corporation and 1-chloro-4-propoxy-thioxanthone available from Aceto Corporation and the like.

Embodiments of the invention, as described herein, also comprise the use of thermal initiators. In a particular embodiment a suitable thermal initiator may comprise any compound capable of producing free radicals at elevated temperatures. In addition a suitable thermal initiator may comprise a compound which generates acid at elevated temperatures. Mixtures of different types of thermal initiators are also within the scope of the invention. In some particular embodiments thermal initiators comprise peroxide or non-peroxide based radical initiators. Examples of useful peroxide initiators, comprise benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy) hexane, di(t-butylperoxy)isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures thereof. Suitable non-peroxide initiators comprise 2,3-dimethyl-2,3-diphenylbutane, 2,3-trimethylsilyloxy-2,3-diphenylbutane, and the like, and mixtures thereof. A preferred thermal initiator is a ketone peroxide such as methyl ethyl ketone peroxide available from Norac, Inc., Azusa, Calif., USA under the trade name NOROX® MEKP-9H. Additionally, in some embodiments the photoinitiator and thermal initiator may be same compound.

Thermal initiators which can generate acid at elevated temperature comprise onium salts, or aryl sulfonium or aryl iodonium salts of weakly basic anions, such as hexafluorophosphate or hexafluoroantimonate. Additionally, thermal coinitiators which facilitate the generation of acid by activating the onium salts at lower temperatures comprise the radical thermal initiators e.g. peroxides, azo compounds, or transition metal compounds, such as copper(I) or copper(II) salts, copper(II) acetylacetonate, palladium(II) acetylacetonate, or ruthenium(III) acetylacetonate, available from Aldrich. In particular embodiments the activated acid generators initiate cationic curing of cyclic ether thermosets.

The thermal initiator is typically present in a range of from about 0.01% by weight to about 10% by weight, preferably in a range of from about 0.1% by weight to about 5% by weight, and more preferably in a range of from about 1% by weight to about 3% by weight, based on the weight of the curable monomer.

The compositions of the invention may further optionally comprise one or more pigments in effective amounts. Optional pigments may comprise one or more color pigments, effect pigments, fluorescent pigments, electrically conductive pigments, magnetically shielding pigments, metal powders, scratch-proofing pigments, organic dyes, or the like, or mixtures thereof.

Examples of suitable effect pigments comprise metal flake pigments such as aluminum bronzes, chromated aluminum bronzes, or stainless steel bronzes, and also nonmetallic effect pigments, such as pearlescent pigments or interference pigments, for example, platelet-shaped effect pigments based on iron oxide with a color from pink to brownish red, or liquid-crystalline effect pigments.

Examples of suitable inorganic color pigments comprise white pigments such as, but not limited to, titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet, cobalt violet or manganese violet, red iron oxide, cadmium sulfoselenide, molybdate red, ultramarine red; brown iron oxide, spinel phases, corundum phases or chrome orange; yellow iron oxide, nickel titanium yellow, chrome titanium yellow, cadmium sulfide, cadmium zinc sulfide, chrome yellow or bismuth vanadate, or the like, or mixtures thereof.

Examples of suitable organic color pigments comprise monoazo pigments, diazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, indigo pigments, metal complex pigments, perinone pigments, perylene pigments, phthalocyanine pigments aniline black, or the like, or mixtures thereof. Examples of fluorescent pigments comprise bis(azomethine) pigments.

Examples of suitable electrically conductive pigments comprise titanium dioxide/tin oxide pigments or mica pigments. Examples of magnetically shielding pigments comprise pigments based on iron oxides or chromium dioxide. Examples of suitable metal powders comprise powders of metals and metal alloys such as aluminum, zinc; copper, bronze or brass.

The dual cure compositions of the invention may further comprise one or more tackifiers. The term tackifier refers to polymeric adhesives which increase the tack, i.e., the inherent stickiness or self-adhesion, of the compositions so that after a short period of gentle pressure they adhere firmly to surfaces. Examples of suitable tackifiers comprise high-flexibility resins such as, but not limited to, homopolymers of alkyl(meth) acrylates, especially alkyl acrylates, such as poly(isobutyl acrylate) or poly(2-ethylhexyl acrylate), which are sold under the brand names ACRONAL® by BASF Aktiengesellschaft, ELVACITE® by Dupont, NEOCRYL® by Avecia, and PLEXIGUM® by Röhm; linear polyesters, as commonly used for coil coating and sold, for example, under the brand names DYNAPOL® by Dynamit Nobel, SKYBOND® by SK Chemicals, Japan, or under the commercial designation LTW by Hüls; linear difunctional oligomers, curable with actinic radiation, with a number average molecular weight of more than 2000, in particular from 3000 to 4000, based on polycarbonatediol or polyester-diol, which are sold under the designation CN 970 by Craynor or the brand name EBECRYL® by UCB; linear vinyl ether homopolymers or copolymers based on ethyl, propyl, isobutyl, butyl and/or 2-ethylhexyl vinyl ether, sold under the brand name LUTONAL® by BASF Aktiengesellschaft; or nonreactive urethane urea oligomers, which are prepared from bis(4,4-isocyanatophenyl)methane, N,N-dimethylethanolamine or diols such as propanediol, hexanediol or dimethylpentanediol and which are sold, for example, by Reichhold under the brand name SWIFT RANGE® or by Mitchanol International Ltd., U.K., under the brand name SURKOPAK® or SURKOFILM®.

The composition of the invention may further optionally comprise one or more conventional additives in effective amounts. Examples of suitable additives comprise UV absorbers; light stabilizers such as benzotriazoles or oxalanilides; free-radical scavengers; crosslinking catalysts such as dibutyltin dilaurate or lithium decanoate; slip additives; polymerization inhibitors; defoamers; emulsifiers, especially nonionic emulsifiers such as alkoxylated alkanols and polyols, phenols and alkylphenols or anionic emulsifiers such as alkali metal salts or ammonium salts of alkane carboxylic acids, alkanesulfonic acids, or sulfo acids of alkoxylated alkanols or polyols, phenols or alkylphenols; wetting agents such as siloxanes, fluorine compounds, carboxylic monoesters, phosphoric esters, polyacrylic acids or their copolymers, polyurethanes or acrylate copolymers, which are available commercially under the tradename MODAFLOW® or DISPERLON®; adhesion promoters such as tricyclodecane-dimethanol; leveling agents; film-forming auxiliaries such as cellulose derivatives; flame retardants; sag control agents such as ureas, modified ureas and/or silicas, rheology control additives, such as those known from the patents WO94/22968, EP0276501A1, EP0249201A1, and WO97/12945; crosslinked polymeric microparticles, as disclosed for example in EP0008127A1; inorganic phyllosilicates such as aluminum magnesium silicates, sodium magnesium phyllosilicates or sodium magnesium fluorine lithium phyllosilicates of the montmorillonite type; silicas such as AEROSILS® silicas; or synthetic polymers comprising ionic and/or associative groups such as polyvinyl alcohol, poly (meth)acrylamide, poly(meth)acrylic acid, polyvinylpyrrolidone, styrene-maleic anhydride or ethylene-maleic anhydride copolymers or their derivatives or hydrophobically modified ethoxylated urethanes or polyacrylates; flatting agents such as magnesium stearate; and/or precursors of organically modified ceramic materials such as hydrolyzable organometallic compounds, especially of silicon and aluminum. Mixtures of such additives are also suitable in particular embodiments.

The method of preparing the composition of the invention may generally be carried out using conventional mixing of the above-described components in appropriate mixing equipment, such as, but not limited to, stirred tanks, dissolvers, homogenizers, pressure release homogenizers, inline dissolvers, toothed-wheel dispersers, microfluidizers, stirred mills, extruders, or like equipment. It will be appreciated that appropriate measures to minimize premature curing are typically employed. When compositions in embodiments of the invention are employed to prepare composite or laminate articles, the compositions may be combined with core material, layer materials, or the like using known methods. In a particular embodiment such articles are made using a resin infusion method.

In a typical embodiment the composition is available as a viscous gel or a liquid. The composition may be at least partially cured by exposing to radiation having a wavelength in the range of from about 200 nanometers to about 1000 nanometers, for example. Suitable sources of such radiation may include, but are not limited to, mercury arcs, carbon arcs, low pressure mercury arcs, medium pressure mercury arcs, medium pressure mercury lamps, high pressure mercury lamps, swirling flow plasma arcs, ultraviolet light emitting diodes, ultraviolet light emitting lasers, and the like. In particular embodiments the composition may advantageously be at least partially cured or completely cured in the bulk state without the use of any external solvents or diluents.

Upon exposure to radiation, the photoinitiator dissociates to give rise to free radicals or acid, which then initiate the curing of the photocurable monomer. The photocuring step is an exothermic reaction and involves evolution of heat, which results in an increase in temperature. Depending on the choice of the curable monomer or combinations of curable monomers, and other known factors, the extent of temperature rise may be controlled. The increase in the temperature (sometimes referred to as an exotherm) results in the dissociation of the thermal initiator to give rise to free radicals, or acid, or other species effecting curing. The free radicals or acid generated from the thermal initiator will further initiate curing of the thermally curable monomer, which will generate additional heat through exothermic reaction and continue to propagate the cure through the thickness of the composition. Thus, the composition is cured by thermal curing as well as photocuring methods. Unless the type of curing is specified, the terms "cured", "curing"; and "curing step", as used herein, comprise both photocuring and thermal curing steps. This typically results in solidifying or at least partially solidifying of the curable composition. The composition may be partially cured or may be completely cured, to obtain a solid cured composition having sufficient strength for the application being targeted. Partial curing is said to have occurred when one or both of the photocuring or thermal curing steps are at least partially completed.

The time of exposure of the composition to radiation and the intensity of the radiation may vary greatly. In various embodiments the time of exposure to radiation or the intensity of the radiation or both are sufficient to provide an exotherm sufficient to initiate thermal curing. In particular embodiments the time of exposure is generally in the range of from about 1 second to about 5 hours, more preferably in the range of from about 5 seconds to about 1 hour. These parameters may be readily determined by one skilled in the art. In one embodiment variations in the intensity of radiation and time of exposure of the composition may be employed to control the time taken to initiate thermal curing, giving rise to "cure on demand" compositions.

In some embodiments the composition is exposed to the radiation for a time period just sufficient to provide an exotherm sufficient to initiate thermal curing, following which the radiation source is turned off, and complete curing is achieved by thermal curing. Subsequent to turning off the radiation source, only thermal curing occurs. No other outside energy source is employed to complete the curing of the composition after the radiation source is turned off. In particular embodiments the composition is exposed to the radiation for a time period sufficient to provide an exotherm sufficient to complete the curing of the composition by thermal curing. In other particular embodiments the radiation source is turned off either before or after or at the point at which the exotherm peak is achieved. In particular embodiments the radiation source is turned off before complete curing of the resin is achieved. This results in significant reduction in energy usage, thus giving rise to a cost effective process.

In other embodiments compositions of the invention can be blended with at least one additional resin formulation, which can be cured thermally such that the exotherm generated from the compositions of the invention upon partial photocuring can be used to initiate the onset of the thermal curing process which then goes to completion without the application of an external heat source and after the radiation source applied for photocuring has been turned off. Illustrative additional resin formulations comprise epoxy resins in the presence of a hardener.

Embodiments of the method described herein have been used advantageously to cure compositions to form thick structures, without the use of any external heat source, such as an oven, an infrared heating lamp, a heating blanket or like heat source, by utilizing the exothermic nature of the photocuring system, and thus inducing thermal initiation and curing in sections where radiation of the photocuring step cannot penetrate. This method also results in efficient and uniform curing in all portions of the structure being formed. The described method typically results in significant time, energy and cost savings, among other advantages.

Figure 3:
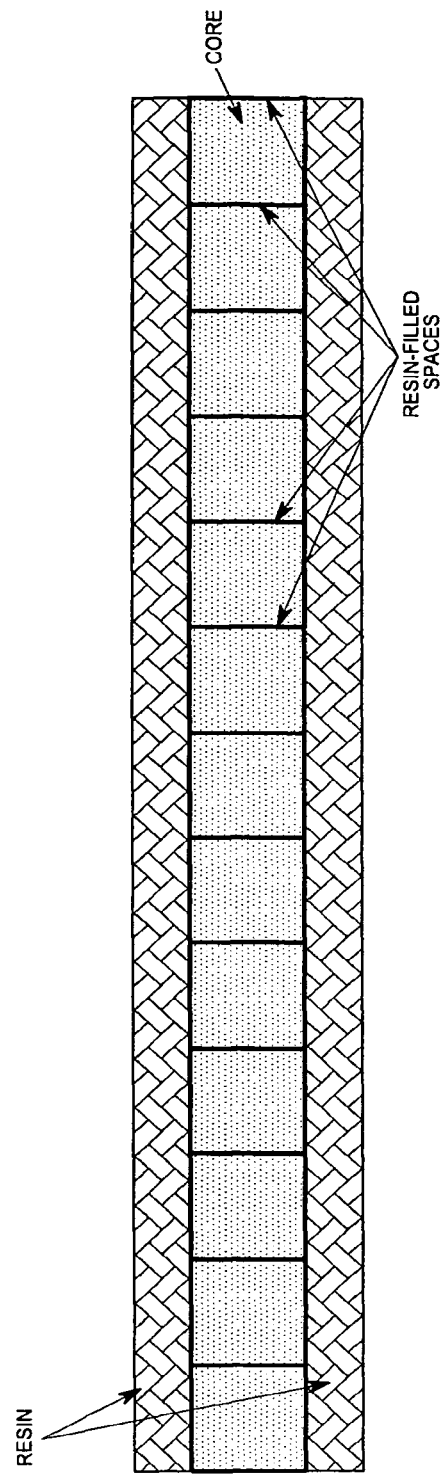
FIG. 3 shows a representative sandwich structure prepared in an embodiment of the invention.

In another embodiment the method described herein has been used advantageously to provide sandwich structures comprising a reinforcing filler core sandwiched between composite laminate (sometimes referred to as skin), wherein the skin comprises a dual cure composition of the invention. Typically the core itself is light weight, and the composite sandwich structure overall is a light weight structure with very high bending stiffness. The core material generally has a density less than 80% of the composite skin density and more preferably less than 50% of the composite skin density. Non-limiting examples of the core material comprise wood, honeycomb, foam, slitted foam, and the like. Foam core may be made from thermosets or thermoplastics. Typically the core material is UV opaque. In many embodiments the core material has resin pathways through the core to enable transfer of heat and free radicals to propagate the cure through the full thickness. A representative sandwich structure is shown in FIG. 3 wherein resin filled spaces are depicted as vertical lines through the core of the sandwich structure, the vertical lines corresponding to the said resin pathways.

The composition and the methods described may be advantageously used to make shaped components and articles. The method is especially useful to make components and articles having thicknesses greater than about 0.1 millimeters in some embodiments, greater than about 0.5 millimeters in other embodiments, and greater than about 1 centimeter in other embodiments. Illustrative shaped components and articles comprise automotive components such as body panels, truck beds, protective plates, fenders, spoilers, hoods, doors or lamp reflectors; sanitary articles and household implements; components for buildings, both inside and outside such as doors, windows, and furniture; industrial components, including coils, containers, and radiators; and electrical components, including wound articles, such as coils of electric motors; wind rotor blades for wind turbines; aerospace articles, bridge components, marine articles, sporting goods, pipes, missiles, and the like. Preferred shaped components and articles may also be made of SMC (sheet molded compound) or BMC (bulk molded compound) as the dual cure composition.

The composition and the methods described may be advantageously used in composite repair in aerospace composites, marine composites, automotive composites, composite tanks, composite pipes, and the like. Dual cure resin compositions also provide benefits of rapid cure for in service repair of thick, highly filled composites or sandwich structures using EHS friendly energy sources such as UV. Dual cure resin compositions minimize issues with thermal management issues required with purely thermal cure resins since a separate, external heat source is not needed to initiate cure, and heat is generated within the resin itself.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner. In the following examples and comparative examples the curable monomer was DION® 9800-05 urethane-modified vinyl ester resin obtained from Reichhold Chemical Company, Durham, N.C. Bis(2,4,6-trimethylbenzoyl)-phenylphosphine oxide (also referred to hereinafter as "phosphine oxide") was IRGACURE® 819 obtained from Ciba Specialty Chemicals, Tarrytown, N.Y., USA. 3,4-Epoxycyclohexylmethyl-3,4-epoxy-cyclohexane carboxylate, a cycloaliphatic diepoxide (also referred to hereinafter as UVACURE® 1500), was obtained from Cytec Surface Specialties. Phenyl-p-octyloxyphenyl-iodonium hexafluoroantimonate, (also referred to hereinafter as UVACURE® 1600), was obtained from Cytec Surface Specialties. The epoxy laminating resin was type L135i having an epoxy equivalent of 166-185 obtained from MGS Kunstharzprodukte Gmbh, Stuttgart, Germany. Amine hardener was H134i/H137i with an average amine equivalent of 52 obtained from MGS Kunstharzprodukte Gmbh, Stuttgart, Germany. Methyl ethyl ketone peroxide, NOROX® MEKP-9H was obtained from Norac, Azusa, Calif., USA. Cobalt naphthenate, dimethyl aniline, and 2,4-pentanedione were obtained from Aldrich. The glass fiber fabric was obtained from Saertex, Moorsville, N.C., USA. Carbon fiber fabric was obtained from Sigmatex, Benicia, Calif., USA.

Interlaminar shear strength (ILSS) was determined by ASTM D2344. Samples were prepared from 30 centimeter (cm)×30 cm panels with 24 plies of 1000 grams per square meter (gsm)+/−45 biax glass fabrics via a vacuum infusion process. Test specimen dimensions were length×width×thickness=10 cm×1.9 cm×1.7 cm and the span length (S) was 6.6 cm with a span ratio (S/T) of 4.

Example 1

A formulation comprising DION® 9800-05 vinyl ester resin, 1.2% MEKP, 0.2% cobalt naphthenate, 0.1% dimethyl aniline, and 1% IRGACURE® 819 photoinitiator placed between glass plates was cured by exposure to 400 W UV-A portable arc lamp for 5 minutes, after which the UV lamp was turned off. A glass laminate was obtained that was 3.2 millimeters (mm) thick.

The resin formulations (abbreviated "Form.") used in additional examples are shown in Table 1. Component amounts are reported in parts by weight.

TABLE 1

| Component | Form. (I) | Form. (II) | Form. (III) | Form. (IV) | Form. (V) |
|---|---|---|---|---|---|
| Curable monomer | 100 | 100 | 100 | 0 | 0 |
| Phosphine oxide | 1 | 0 | 1 | 0 | 0 |
| MEKP-9H | 1.2 | 1.2 | 0 | 0 | 0 |
| Co naphthenate | 0.2 | 0.2 | 0 | 0 | 0 |
| Dimethyl aniline | 0.1 | 0.1 | 0 | 0 | 0 |
| 2,4-pentanedione | 0.2 | 0.2 | 0 | 0 | 0 |
| UVACURE ® 1500 | 0 | 0 | 0 | 100 | 0 |
| UVACURE ® 1600 | 0 | 0 | 0 | 1 | 0 |
| Epoxy laminating resin | 0 | 0 | 0 | 0 | 100 |
| Amine hardener | 0 | 0 | 0 | 0 | 35 |

Example 2

Two glass jars (each 5 centimeters diameter×4.4 centimeters height) were separately filled with 70 gm of formulation (I) in Table 1. A thermocouple was placed in the center of each glass jar to measure temperature rise with time. After 35 minutes, the radiation source IN-A 400 W was turned on to illuminate one of the jars for 15 minutes, after which it was turned off. The temperature increased quickly and reached a peak value of 202° C. As a comparative example, the same formulation (I) was allowed to cure in the second jar without any UV radiation. The temperature in the second jar did not begin to increase until 300 minutes and the temperature finally reached 136.6° C. peak temperature at 330 minutes. FIG. 1 shows the temperature profile at the center of the formulation of each jar as determined by the thermocouples. This demonstrated that the formulation and method of the invention can achieve the cure on demand upon UV radiation exposure at any time, between time zero and 300 minutes in this example.

Example 3 and Comparative Example 1

Figure 2:
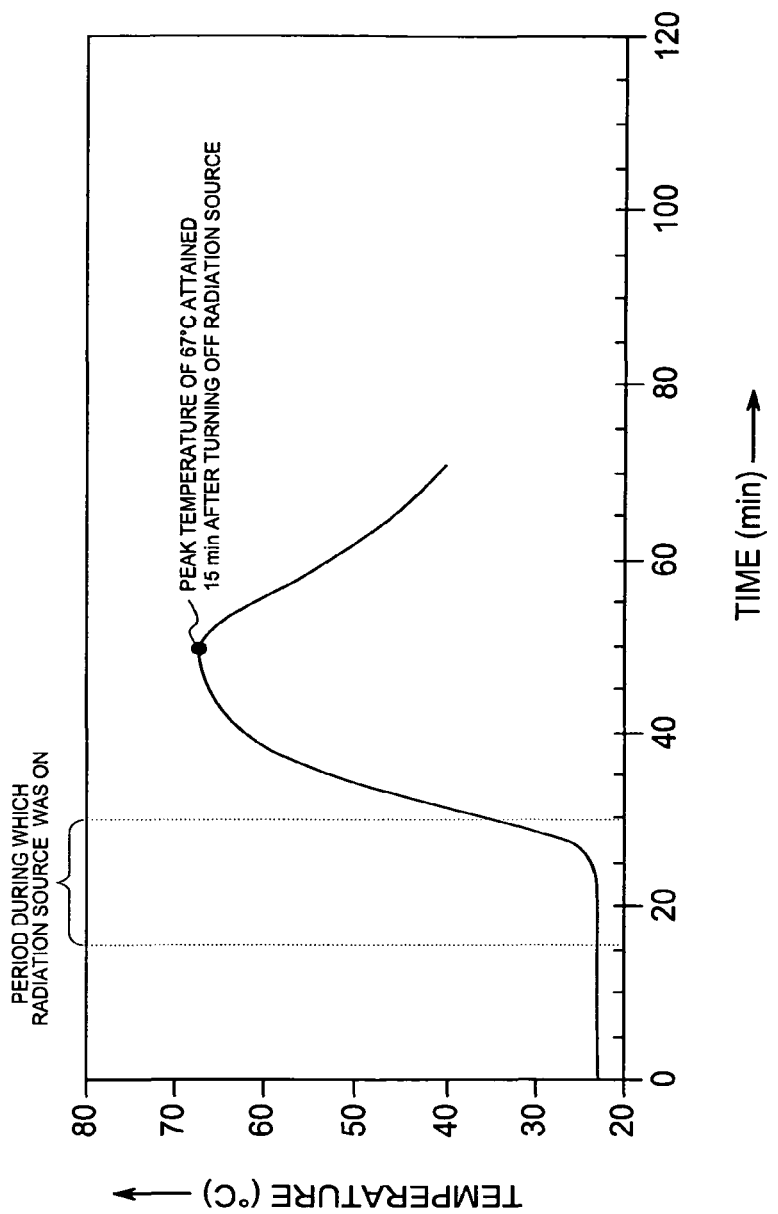
FIG. 2 shows the temperature profile at the center of a formulation in an embodiment of the invention as determined by an embedded thermocouple, wherein during the curing stage, the radiation source was shut off after an exotherm was initiated but before the peak temperature was achieved.

A glass laminate with 24 plies of 1000 gsm+/−45 biax fabrics was prepared from a composition comprising formulation (I) via a resin infusion process for 25 minutes followed by photocuring by exposure to 400 W UV-A for 15 minutes, after which the UV lamp was turned off. FIG. 2 shows the temperature profile at the center of the formulation as determined by an embedded thermocouple. The center temperature reached the maximum temperature of 67° C. in 15 minutes after UV light was shut off. The resin fully solidified after debagging in 60 minutes from the start of 15 minute UV curing step to give rise to a 24 ply 15.9 mm thick glass composite panel. The glass composite laminates produced in this example had the same interlaminar strength properties as the glass fiber composite laminates produced using formulation (II) with a traditional cure schedule of room temperature cure for 4 hours and followed by thermally postcure at 70° C. for 10 hours. Hence, the dual cure formulation (I) using an initial UV cure attained the same product properties with significantly reduced-cure time and energy.

Example 4

Carbon Fiber Composite Samples: A carbon fiber composite formed by using a 5 cm×10 cm carbon fiber fabric (TORAYCA® T700SC-12K-50C, 400 grams) comprising 3 plies formed by hand lay-up and wet laminated with formulation (I). The formulation was cured by exposure to UV radiation from a 400 W UV-A lamp for 10 minutes, after which the UV lamp was turned off. The cured thickness was found to be 2.5 mm and was found to have solidified throughout the sample. This example demonstrates the dual cure composition overcomes the limitation of the UV light penetration through carbon fiber composites.

Comparative Example 2

A carbon fiber composite formed by using a 5 cm×10 cm carbon fiber fabric (TORAYCA® T700SC-12K-50C, 400 grams) comprising 3 plies formed by hand lay-up and wet laminated with formulation (III) exposure to UV radiation from a 400 W UV-A lamp for 10 minutes, after which the UV lamp was turned off. Only the top surface of the composite was cured and tack-free, while the bottom remained a liquid and uncured. This comparative example illustrates the necessity of a thermal initiator in addition to a photoinitiator to attain thorough cure of carbon fiber composites upon UV exposure.

Example 5

Foam core wrapped samples: Glass wet laminate (wet hand lay-up laminate of 1000 grams biax glass fabric) that was saturated with formulation (I) was wrapped around a foam core having the dimensions width×length×thickness=2.5 cm×11.4 cm×0.64 cm. This laminate was then cured by exposure to UV-A radiation from a 400 W UV-A lamp for 10 minutes, after which the UV lamp was turned off. Ten minutes after shutting off the lamp, the bottom layer of laminate was cured to solid. Cured laminated thickness was found to be 1 mm.

Example 6

Thick glass laminate: A 5 cm×7.5 cm wet laminate was prepared from a 1000 grams biax glass fabric saturated with formulation (I). The laminate was then built up to 3.2 cm thick by the hand lay-up method. The laminate was then cured by exposure to UV-A radiation from a 400 W UV-A lamp. After 15 minutes, the UV radiation was shut off. The temperature at the bottom of the laminate (as measured with an IR pyrometer) was found to have increased from 23° C. to 100° C. The laminate block had completely solidified 5 minutes after the UV lamp was shut off.

Example 7

A carbon fiber composite formed by using a 5 cm×10 cm carbon fiber fabric (TORAYCA® T700SC-12K-50C, 400 grams) comprising 10 plies formed by hand lay-up and wet laminated with a resin formulation that was a 50/50 (w/w) blend of formulation (I) and formulation (IV). The composition was cured by exposure to UV radiation from a 400 W UV-A lamp for 14 minutes after which time the UV lamp was turned off, and the temperature at the bottom of the laminate had reached 170.9° C. from 23° C. indicating significant heat exotherm had been generated due to the curing. The sample was examined 5 minutes after turning off the UV lamp. The composite of 6.35 mm thickness was found to have solidified throughout the sample indicating complete curing. This example demonstrates that both free radical and cationic curing mechanisms are applicable in this invention and can be used in combination for dual cure formulations.

Example 8

A thick carbon fiber composite of 2.54 cm was formed by hand lay-up using a 5 cm×10 cm carbon fiber fabric (TORAYCA® T700SC-12K-50C, 400 grams) and wet laminated with a resin formulation that was a 50/50 (w/w) blend of formulation (I) and formulation (IV). The formulation was cured by exposure to UV radiation from a 400 W UV-A lamp for 43 minutes, after which the UV lamp was turned off. The temperature at the bottom of the laminate has reached 182° C. from 23° C. indicating significant heat exotherm had been generated due to the curing. The sample was examined 5 minutes after turning off the UV lamp. The thick cured carbon composite of 2.54 cm was found to have solidified throughout the sample. The example demonstrates that a thick carbon fiber composite can be cured via UV exposure using the formulations and method of the invention.

Example 9

A carbon fiber composite of 6.35 mm formed by hand lay-up using a 5 cm×10 cm carbon fiber fabric (TORAYCA® T700SC-12K-50C, 400 grams) and wet laminated with a resin formulation that was a 50/50 (w/w) blend of formulation (II) and formulation (IV). The formulation was cured by exposure to UV radiation from a 400 W UV-A lamp for 20 minutes, after which time the UV lamp was turned off. The temperature at the bottom of the laminate had reached 192° C. from 23° C. indicating significant heat exotherm had been generated due to the curing. The sample was examined 5 minutes after turning off the UV lamp. The cured carbon composite was found to have solidified throughout the sample. This example demonstrates that a cationic UV curing from cycloaliphatic epoxy can provide heat exotherm to decompose the thermal initiator for free radical curing of the vinyl ester resins.

Example 10

A carbon fiber composite of 6.35 mm formed by hand lay-up using a 5 cm×10 cm carbon fiber fabric (TORAYCA® T700SC-12K-50C, 400 grams) and wet laminated with a resin formulation that is a 50/50 (w/w) blend of formulation (I) and formulation (V). The formulation was cured by exposure to UV radiation from a 400 W UV-A lamp for 32 minutes, after which time the UV lamp was turned off. The temperature at the bottom of the laminate had reached 140° C. from 23° C. indicating significant heat exotherm has been generated due to the curing. The sample was examined 5 minutes after turning off the UV lamp. The cured carbon composite was found to have solidified throughout the sample. This example demonstrates that the dual cure formulation upon UV exposure can provide heat exotherm to activate the thermal curing of an amine/epoxy resin system.

The examples demonstrate that formulations comprising a combination of a photoinitiator and a thermal initiator are capable of forming cured compositions such as, but not limited to, carbon fiber composites and composites with foam core and thick section composites, without separate external application of heat as compared to the comparative example, wherein complete curing could not be achieved in the absence of the thermal initiator and without the separate external application of heat. The examples also demonstrate that the method is applicable to a wide variety of formulations, irrespective of whether the fillers used are UV opaque or UV transparent.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of curing a dual cure composition comprising the steps of: (i) providing a dual cure composition comprising: at least one filler; at least one curable monomer comprising at least one of an ethylenic unit or cyclic ether unit or mixture thereof; at least one photoinitiator; and at least one thermal initiator; (ii) exposing the composition to radiation of a wavelength from a radiation source for a time to at least partially photocure the composition and to provide an exotherm sufficient to continue curing of the composition by thermal curing upon terminating exposure of the composition to the radiation to form a cured composition wherein the filler comprises carbon fabric and/or carbon fibers, the photoinitiator comprises a combination of phosphine oxide and phenyl-p-octyloxylphenyl-iodonium hexafluorantimonate, the thermal initiator comprises methyl ethyl ketone peroxide, the radiation comprises UV-A, and wherein the composition further comprises cycloaliphatic diepoxide and wherein curing of the composition is performed in the absence of heat from an external thermal source.

2. The method of claim 1, wherein the radiation source is turned off before complete curing of the composition is achieved and wherein curing of the composition is performed in the absence of heat generated by an external thermal source.

3. An article produced by the method of claim 1.

4. A method of curing a dual cure composition on at least one surface of a reinforcing core material comprising the steps of: (i) providing a dual cure composition comprising: at least one filler; at least one curable monomer comprising at least one of an ethylenic unit or cyclic ether unit or mixture thereof; at least one photoinitiator; and at least one thermal initiator; (ii) applying the composition onto at least one surface of the reinforcing core material; (iii) exposing the composition to radiation of a wavelength from a radiation source for a time to at least partially photocure the composition and to provide an exotherm sufficient to continue curing of the composition by thermal curing upon terminating exposure of the composition to the radiation to form a cured composition wherein the reinforcing core material is comprised of foam, slitted foam, honeycomb, or combinations thereof, and/or wood having resin filled pathways through the wood that enable transfer of heat to propagate through the wood and the composition to cure the composition, wherein the radiation source is turned off before complete curing of the composition is achieved and wherein curing of the composition is performed in the absence of heat generated by an external thermal source.

5. An article produced by the method of claim 4.

6. The method of claim 4 wherein the reinforcing core material is comprised of foam, slitted foam, honeycomb, or combinations thereof.

7. The method of claim 1, wherein the radiation wavelength is in the range of from about 200 nanometers to about 1000 nanometers.

8. The method of claim 4, wherein the exposing occurs for a time period of about 1 second to about 5 hours.

9. The method of claim 4, wherein the composition is fully cured.

10. A method of curing a dual cure composition comprising the steps of: (i) providing a dual cure composition comprising: at least one filler; at least one curable monomer comprising at least one of an ethylenic unit or cyclic ether unit or mixture thereof; at least one photoinitiator; and at least one thermal initiator; (ii) exposing the composition to radiation of a wavelength from a radiation source for a time to at least partially photocure the composition and to provide an exotherm sufficient to continue curing of the composition by thermal curing upon terminating exposure of the composition to the radiation to form a cured composition wherein the photoinitiator comprises a combination of phenyl-p-octyloxylphenyl-iodonium hexafluorantimonate and any one or more of phosphine oxide and cycloaliphatic diepoxide.

11. The method of claim 4, wherein the photoinitiator comprises phosphine oxide, the thermal initiator comprises methyl ethyl ketone peroxide, and the radiation comprises UV-A.

12. The method of claim 4, wherein the photoinitiator comprises a combination of phenyl-p-octyloxylphenyl-iodonium hexafluorantimonate and any one or more of phosphine oxide and cycloaliphatic diepoxide and the radiation comprises UV-A.

13. The method of claim 11, wherein the cured composition has a thickness greater than 6 millimeters.

14. The method of claim 11, wherein the cured composition has a thickness from 2.5 millimeters to 16 millimeters.

15. The method of claim 11, wherein the cured composition has a thickness from 2.5 millimeters to 6.35 millimeters.

16. An article produced by the method of claim 12.

17. The method of claim 10 wherein the filler is a UV opaque filler comprising carbon fibers, carbon black, carbon nanotubes, silicon carbide, boron nitride, titanium dioxide, zirconium oxide, chalk, calcium sulfate, barium sulfate, calcium carbonate, silicates, talc, mica, kaolin, silica, aluminum hydroxide, magnesium hydroxide, polymer powder, polymer fiber, or combinations thereof; wherein the cured composition has a thickness of at least about 0.1 millimeter.

18. The method of claim 10 wherein curing of the composition is performed in the absence of heat from an external thermal source.

19. The method of claim 10, wherein the radiation wavelength is in the range of from about 200 nanometers to about 1000 nanometers.

20. The method of claim 10, wherein the exposing occurs for a time period of about 1 second to about 5 hours.

21. The method of claim 10, wherein the composition is fully cured.

22. An article produced by the method of claim 10.

23. An article produced by the method of claim 18.

* * * * *

UNITED STATES PATENT AND TRADEMARK OFFICE
CERTIFICATE OF CORRECTION

Page 1 of 2

PATENT NO. : 9,133,283 B2
APPLICATION NO. : 13/533685
DATED : September 15, 2015
INVENTOR(S) : Yang et al.

It is certified that error appears in the above-identified patent and that said Letters Patent is hereby corrected as shown below:

On the Title Page, in Item (75), under "Inventors", in Column 1, Line 1, delete "Patrick Wenliang Yang," and insert -- Wenliang Patrick Yang, --, therefor.

In the Specification

In Column 5, Line 2, delete "Specialty." and insert -- Specialty --, therefor.

In Column 5, Line 33, delete "CYRACURETh" and insert -- CYRACURE™ --, therefor.

In Column 7, Line 11, delete "zinc;" and insert -- zinc, --, therefor.

In Column 8, Line 59, delete ""curing";" and insert -- "curing", --, therefor.

In Column 10, Line 66, delete "Moorsville," and insert -- Mooresville, --, therefor.

In Column 11, Line 7, delete "(SIT)" and insert -- (S/T) --, therefor.

In Column 11, Line 43, delete "IN-A" and insert -- UV-A --, therefor.

In Column 12, Line 10, delete "reduced-cure" and insert -- reduced cure --, therefor.

In the Claims

In Column 14, Line 37, in Claim 1, delete "hexafluorantimonate," and insert -- hexafluoroantimonate, --, therefor.

In Column 15, Line 8, in Claim 7, delete "claim 1," and insert -- claim 4, --, therefor.

Signed and Sealed this
Twenty-sixth Day of January, 2016

Michelle K. Lee
*Director of the United States Patent and Trademark Office*

CERTIFICATE OF CORRECTION (continued)
U.S. Pat. No. 9,133,283 B2

In Column 15, Line 28, in Claim 10, delete "hexafluorantimonate" and insert -- hexafluoroantimonate --, therefor.

In Column 16, Line 3, in Claim 12, delete "hexafluorantimonate" and insert -- hexafluoroantimonate --, therefor.